(12) United States Patent
Ladd et al.

(10) Patent No.: US 8,085,201 B2
(45) Date of Patent: Dec. 27, 2011

(54) SYSTEM FOR DETERMINING POSITION OVER A NETWORK

(75) Inventors: Jonathan Ladd, Bridgewater, NH (US); Patrick C. Fenton, Calgary (CA)

(73) Assignee: NovAtel Inc., Calgary, Alberta (CA)

( * ) Notice: Subject to any disclaimer, the term of this patent is extended or adjusted under 35 U.S.C. 154(b) by 387 days.

(21) Appl. No.: 12/270,405

(22) Filed: Nov. 13, 2008

(65) Prior Publication Data

US 2009/0121940 A1    May 14, 2009

Related U.S. Application Data (60) Provisional application No. 60/987,523, filed on Nov. 13, 2007, provisional application No. 61/016,182, filed on Dec. 21, 2007.

(51) Int. Cl.
*G01S 3/02* (2006.01)
(52) U.S. Cl. .................................. 342/464; 342/463
(58) Field of Classification Search ............... 342/464, 342/463
See application file for complete search history.

(56) References Cited

U.S. PATENT DOCUMENTS

| | | | |
|---|---|---|---|
| 3,742,498 A | 6/1973 | Dunn | |
| 3,787,862 A * | 1/1974 | Jacobson | 342/418 |
| 5,663,735 A | 9/1997 | Eshenbach | |
| 5,786,773 A | 7/1998 | Murphy | |
| 5,945,948 A | 8/1999 | Buford et al. | |
| 6,212,475 B1 | 4/2001 | France et al. | |
| 6,492,945 B2 * | 12/2002 | Counselman et al. | 342/464 |
| 6,556,942 B1 | 4/2003 | Smith | |
| 6,560,535 B2 | 5/2003 | Levy et al. | |
| 7,405,694 B1 | 7/2008 | Hwang et al. | |
| 7,511,662 B2 | 3/2009 | Mathews et al. | |
| 7,511,667 B2 | 3/2009 | Matsuoka et al. | |
| 7,576,690 B2 | 8/2009 | Vollath | |
| 2001/0009563 A1* | 7/2001 | Kohli et al. | 375/150 |
| 2001/0050633 A1* | 12/2001 | Thomas | 342/387 |

(Continued)

FOREIGN PATENT DOCUMENTS

CA 2398781 5/2002

(Continued)

*Primary Examiner* — Thomas Tarcza
*Assistant Examiner* — Frank McGue
(74) *Attorney, Agent, or Firm* — Cesari and McKenna, LLP; Patricia A. Sheehan

(57) ABSTRACT

A system to determine position, frequency and clock offsets over a network utilizing signals of opportunity transmitted by one or more transmitters with known locations, the system includes a base receiver with a clock and a known position that determines ranges to the transmitters, takes a series of samples of the signals of opportunity and time tags the series with times of receipt, calculated times of transmission based on the calculated ranges, or both. The base receiver transmits the time tagged series and, as appropriate, computed ranges to the remote receivers. A given remote receiver saves and time tags samples of the signals of opportunity, correlates the time-tagged series with the saved samples, and calculates a time offset as a time difference of the times of receipt at the remote receiver and either the time of receipt at the base receiver or the time of transmission calculated at the base receiver. The remote receiver calculates position based on the time offsets, and as appropriate, the ranges provided by the base receiver. The elevations of the remote receivers may be calculated as part of the position calculations, determined iteratively based on constraining the Z coordinate to an average elevation, or determined from differences in air pressure sensor readings at the base and remoter receivers.

25 Claims, 4 Drawing Sheets

U.S. PATENT DOCUMENTS

| | | |
|---|---|---|
| 2003/0058163 A1 | 3/2003 | Zimmerman et al. |
| 2003/0072356 A1* | 4/2003 | Abraham et al. ............ 375/148 |
| 2003/0085839 A1 | 5/2003 | Zhodzishky et al. |
| 2004/0130485 A1 | 7/2004 | Rapoport et al. |
| 2004/0207556 A1* | 10/2004 | Spilker et al. ............... 342/464 |
| 2005/0057395 A1* | 3/2005 | Atkinson et al. ............. 342/464 |
| 2005/0197769 A1 | 9/2005 | Sochren et al. |
| 2005/0201421 A1 | 9/2005 | Bhandari et al. |
| 2007/0050824 A1* | 3/2007 | Lee et al. ...................... 725/81 |
| 2007/0182633 A1 | 8/2007 | Omura et al. |
| 2007/0241960 A1 | 10/2007 | Feller |
| 2007/0282565 A1* | 12/2007 | Bye et al. ...................... 702/158 |
| 2009/0256750 A1* | 10/2009 | Mathews et al. .............. 342/450 |

FOREIGN PATENT DOCUMENTS

| | | |
|---|---|---|
| EP | 0747721 | 12/1996 |
| EP | 1254545 | 10/2007 |
| GB | 2353648 | 2/2001 |
| WO | WO 97/28455 | 8/1997 |
| WO | WO 99/48233 | 9/1999 |

* cited by examiner

SYSTEM FOR DETERMINING POSITION OVER A NETWORK

CROSS REFERENCE TO RELATED APPLICATIONS

This application claims priority from U.S. Provisional Patent Application Ser. No. 60/987,523 filed Nov. 13, 2007; U.S. Provisional Patent Application Ser. No. 61/016,182 filed Dec. 21, 2007 and U.S. patent application Ser. No. 12/263, 940 filed Nov. 3, 2008, which are assigned to a common Assignee and incorporated herein by reference in their entireties.

BACKGROUND OF THE INVENTION

1. Field of the Invention

The invention relates generally to systems and methods for determining position and clock offsets using radiated "signals of opportunity," such as radio and television signals.

2. Background Information

Determining position is critical for high speed wireless networks that provide hand-offs to the nearest cell tower or other network devices. Further, position is critical for accurate time transfer over the network. GNSS receivers can provide position information, as long as the antennas at the remote locations have sufficiently clear views of the sky. However, there is a need for position information at remote locations that do not have such views of the sky and, in particular, at remote devices that may be located in buildings or other harsh environments for GNSS solutions.

One method for determining position using signals of opportunity is described in U.S. Pat. No. 6,492,945 to Counselman. The Counselman method, which determines instantaneous position of a moving radio receiver, utilizes double-differenced carrier phase measurements. The obstacle that the Counselman system must overcome for precise position, however, is the carrier cycle ambiguity.

SUMMARY OF THE INVENTION

A method and system for providing position information uses existing radiated signals of opportunity, such as AM or FM radio signals, television signals, signals from geo-stationary communications satellites, and so forth, and, more particularly, the modulation of the signals of opportunity. The method and system use the essentially pseudorandom properties of the modulated signals to establish times of arrival of the signals of opportunity without ambiguity. Using the signals from a plurality of signal of opportunity transmitters, the remote receivers can accurately determine their positions.

The locations of the plurality of signal of opportunity transmitters (referred to hereinafter as the "SOP transmitters") are known or readily available to the remote receivers and also to a base station receiver that has a clock and a known position of at least two dimensions. The base station receiver calculates ranges to the respective SOP transmitters using the known positions, and provides the ranges to the remote receivers. The base station receiver also takes samples of the signals of opportunity transmitted by the respective SOP transmitters, time tags the signal samples with the times of receipt, and provides the time-tagged signals to the remote receivers over a communications network.

The remote receivers, over an overlapping time period, time tag and store samples of the plurality of signals of opportunity. The remote receivers correlate the received time tagged signal samples with the stored signals, and determine time offsets for the respective time-tagged signals. The time offset for a given signal of opportunity is based on the differences in the positions of the base station receiver and the respective remote receivers relative to the SOP transmitter, as well as the differences between the clocks at the base receiver and the respective remote receivers, that is, the remote receivers' clock offsets. A given remote receiver determines its two dimensional position and its clock offset using pseudoranges calculated from the times of arrival at the base receiver and the remote receiver of the signals of opportunity broadcast by at least three SOP transmitters.

As appropriate, the system may use a three dimensional position of the base receiver and three dimensional positions of the SOP transmitters and determine three dimensional positions and the associated clock offsets for the remote receivers using the signals of opportunity transmitted by four or more SOP transmitters.

In addition, or instead, the base and remote receivers may include air pressure sensors, and the elevation of the remote receiver may be determined relative to the base receiver based on the air pressure differentials between the two receivers. Since the elevation of the base receiver is known, the actual elevation of a given remote receiver can be determined in this manner to within 1 or 2 meters.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
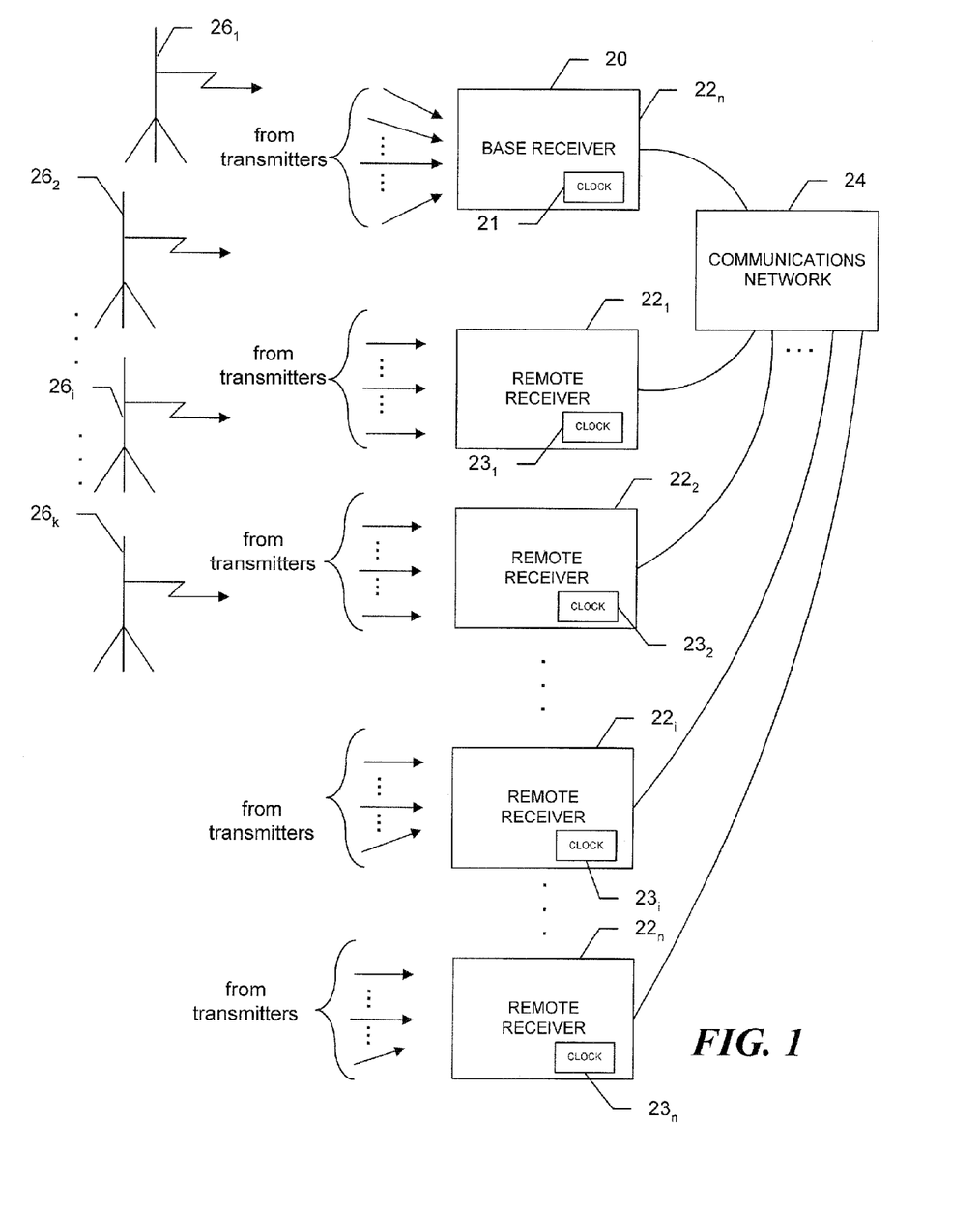
FIG. 1 is a functional block diagram of a system constructed in accordance with the invention.

Referring to FIG. 1, a reference, or base station, receiver 20 (referred to hereinafter as the "base receiver") and remote receivers $22_1, 22_2 \ldots 22_n$, are connected to a communication network 24, such as, for example, the internet or a private network. Each of the receivers receives signals broadcast from a plurality of high power radiators $26_1, 26_2 \ldots 26_j$, with known locations, i.e., AM/FM radio transmitters, Beacon transmitters, television station transmitters, geo-stationary communications satellites, and so forth, with respective service areas that cover all or part of the network.

The broadcast signals, which are selected due to their quality of signal, known transmission locations, and continuous broadcast, are "signals of opportunity," that is, signals that are broadcast at various frequencies and for purposes such as the transmission of random conversation or dialog. These are pre-existing signals, which are not specifically designed and operated for determining positions and/or time or clock offsets. This is in contrast to GNSS signals, for example, which are specifically designed to provide position, velocity and time to radio receivers on earth. The GNSS signals, which are broadcast at the same frequencies by GNSS satellites, carry particular codes for this purpose. Further, in contrast to known systems for determining positions and/or time or clock offsets, the current system does not utilize the data or content of information modulated onto the broadcast signals. Rather, the current system utilizes the frequency content of the modulation signals. The radiators are referred to hereinafter as the "SOP transmitters."

The locations of the SOP transmitters $26_1, 26_2 \ldots 26_j$ are usually known or can be readily determined from the information provided by a registration authority, such as, for example, the U.S. Federal Communications Commission. The information may be available, for example, over the internet. The network 24 may provide the base and remote receivers with a list of usable signals of opportunity and/or the system may select particular signals of opportunity for the stability of their carrier frequencies, their modulated frequency content, their spacial diversity and based on the field strengths of the signals at the respective receivers.

Notably, the broadcast signals of opportunity are of sufficiently low frequency to have excellent building penetration. Thus, the remote receivers need not have particularly good views of the sky, but instead must have relatively good reception of the selected broadcast signals of opportunity. Further, the use of such low frequency signals allows the receivers to scan with configurable front end filters, such as charged capacitor filters or digital FIR filters, to find the best signal of opportunity candidates.

The system has available the $X_{SOPi}, Y_{SOPi}, Z_{SOPi}$ position coordinates of the respective ground-based SOP transmitters $26_i$, through the information available from the regulatory agency and/or area topological maps, surveys and so forth. The location of the base receiver 20 is known in at least two dimensions, namely, $X_{base}, Y_{base}$ and may be known in three dimensions, that is, $Z_{base}$ is known. Further, the base receiver has time provided by a base receiver clock 21, which may but need not be synchronized to a reference source such as GNSS or UTC time. The remote receivers $22_1, 22_2 \ldots 22_n$ may have unknown positions, and their clocks $23_1, 23_2 \ldots 23_n$ may have unknown clock offsets from the base receiver clock.

Preferably, the base receiver has a sufficiently clear view to also determine its three dimensional position using GNSS satellite signals. Otherwise, the position coordinates of the base receiver must be known by, for example, GNSS satellite information obtained from a hand held GPS receiver during installation of the base receiver, through a survey, and/or through use of topological maps.

Using the known position coordinates, the base receiver 20 calculates the ranges to the respective selected SOP transmitters $26_i$ as $$Range_{base-SOP_i} = \sqrt{(X_{base} - X_{SOP_i})^2 + (Y_{base} - Y_{SOP_i})^2}$$

for two dimensional solutions, or $$Range_{base-SOP_i} = \sqrt{(X_{base} - X_{SOP_i})^2 + (Y_{base} - Y_{SOP_i})^2 + (Z_{base} - Z_{SOP_i})^2}$$

for three dimensional solutions.

For SOP transmitters $26_i$ that are far away with respect to the distances between the base and remote receivers, the ranges from the base receiver may be determined using direction vectors. Direction vectors are used, for example, with SOP transmitters such as geo-stationary communications satellites, Beacon transmitters that may be thousands of miles away, and so forth. The base receiver provides the calculated ranges to the remote receivers over the communications network 24.

Figure 2:
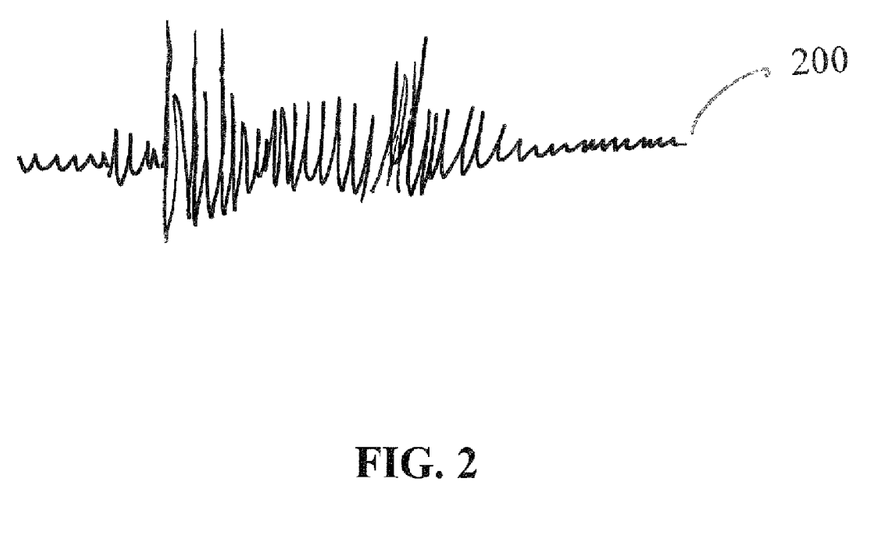
FIG. 2 illustrates a series of signal samples.

Referring also to FIG. 2, the base receiver 20, for a given SOP transmitter $26_i$, takes a series of samples 200 of the broadcast signal of opportunity and time tags the series with the time of receipt at the base receiver. The series may be a fraction of a second long or longer, for example, ¼ second long. The base receiver may take the samples continuously or at predetermined times, as appropriate. The base receiver may time-tag each sample in the series, the first sample or certain samples. The base receiver then transmits the time tagged series to the remote receiver 22 over the communication network 24. The base receiver may compress the series for ease of transmission over the network.

The remote receiver $22_i$ is similarly saving and time tagging samples of the broadcast signals of opportunity with the time of receipt based on the remote receiver's local clock $23_i$. The remote receiver may save samples of signal segments that have the same length or are slightly longer than the series of samples, as appropriate, to ensure capture of corresponding signal samples. The remote receiver correlates the series of samples received from the base receiver 20 with the saved time-tagged data such that the signal samples align, and determines time offsets $TO_i$:

$$TO_i = T_{base-i} - T_{remote-i}$$

where $T_{base-i}$ is the time of receipt at the base receiver of the series of samples transmitted by SOP transmitter $26_i$ and $T_{remote-i}$ is the time of receipt of the series at the remote receiver. The time offset is based on the differences in the locations of the base receiver and the remote receiver relative to the SOP transmitter $26_i$, as well as the remote receiver's clock offset. The remote receiver's clock offset is the time difference between the remote receiver's clock and the base receiver's clock.

The remote receiver $22_i$ determines the time offset using received series of samples 200 that have diverse frequency content, such as a series that corresponds to a change in the broadcast signal that is distinct from the background signal and is not regularly repeated, such as, for example, a particular bit of conversation. The modulated signal thus has a pseudorandom property that can be exploited by the system. These series represent "modulation events," and the alignment of the saved and received modulation events produce a correlation function that has an essentially triangular shape, that is, a correlation function with a single correlation peak. The series that correspond to repeating sounds, such as, for example, certain musical segments, are not utilized to determine time offsets because the associated correlation function has multiple peaks and a time offset can thus not be determined with sufficient accuracy.

The remote receiver $22_i$ sequentially correlates the received series of samples 200, or modulation event, with the saved time-tagged signal sample data and selects the saved data that produces the highest correlation value. The remote receiver then determines the time offset as discussed above. The time offset value is verified by repeating the process with subsequent modulation events provided by the base receiver 20.

For increased correlation accuracy, the remote receiver $22_i$ may make fine adjustments to the phase of the demodulation sample collection process. The samples taken at the base receiver 20 and the remote receiver $22_i$ may be taken at slightly different times, since the samples are taken with respect to the receivers' clocks. Accordingly, the accuracy of the time alignment with a correlation process that relies on the best fit, i.e., selecting the highest correlation value, is essentially limited by the sampling rate. For increased accuracy, the remote receiver makes the fine adjustments to drive the sampling times at the remote receiver closer to the sampling times at the base receiver.

The remote receiver $22_i$ thus determines if the correlation values on either side of the correlation function peak, that is, earlier and later correlation values, are essentially symmetrical. If not, the remote receiver shifts the phase of the sample collection process, that is, a sample clock, in the direction of the larger of the earlier or later correlation values. The remote receiver may shift the phase by a predetermined amount each time it performs the analysis. Alternatively, the remote receiver may shift the phase by an amount that corresponds to the magnitude of the differences in the earlier and later correlation values. Before determining if the earlier and later correlation output values are essentially symmetrical, the remote receiver $22_i$ may filter the correlation output values by, for example, averaging them over successive series, before making the comparisons. When the phase of the sampling collection process in the remote receiver is aligned to within one wavelength of the signal of opportunity to the sampling collection process in the base receiver, the carrier cycle ambiguity between the tracking channels in the base receiver and the remote receiver is resolved, and positions can be determined with even more accuracy. The base receiver 20 calculates ranges to the selected plurality of SOP transmitters 26 and the remote receiver $22_i$ calculates the corresponding time offsets for at least three signals of signals of opportunity for a two dimensional solution and at least four signal of opportunity for a three dimensional solution. Preferably, the respective signals of opportunity are selected such that they have special diversity that is the locations of the SOP transmitters are spread out in different directions relative to the locations of the respective remote receivers.

Figure 3:
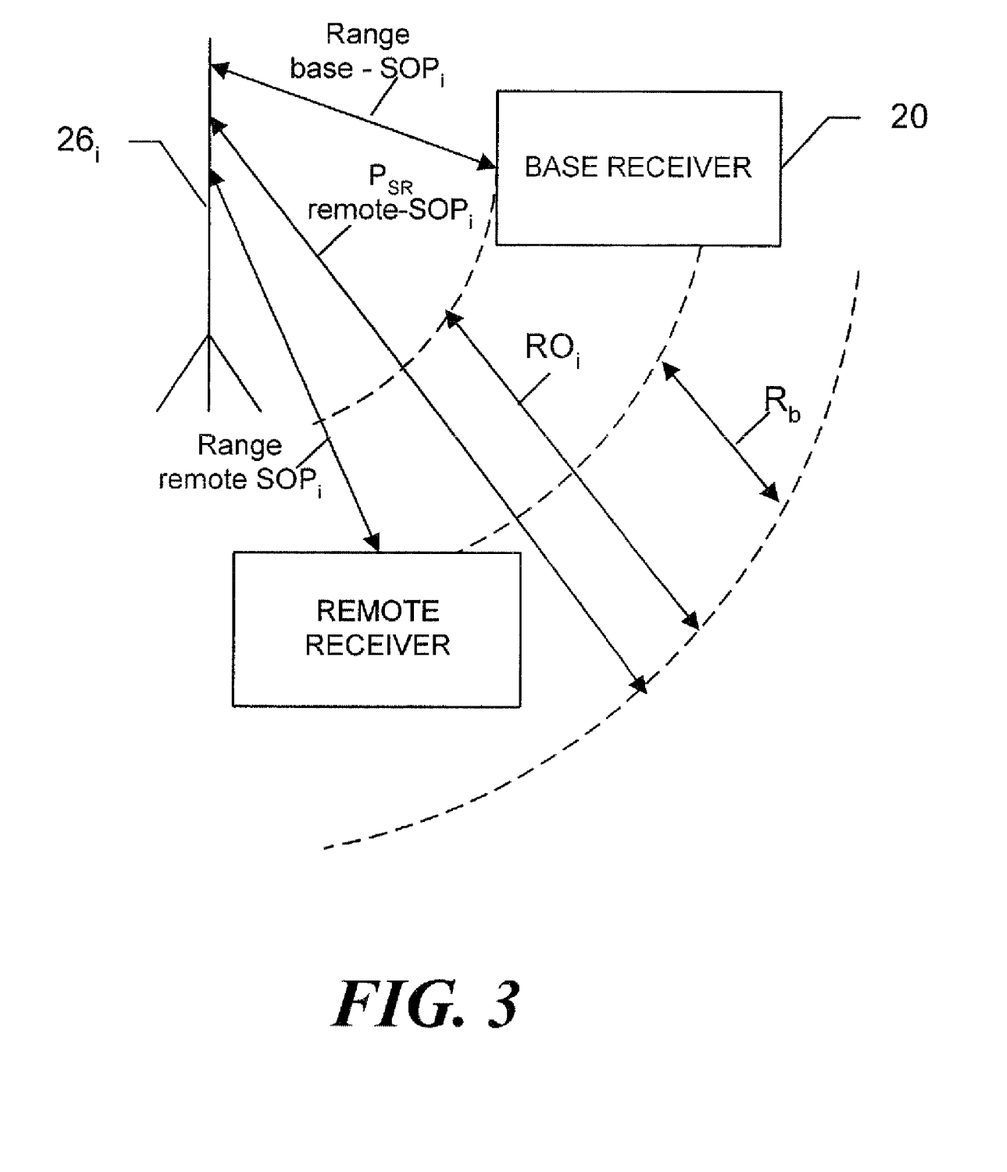
FIG. 3 is a diagram that illustrates ranges, pseudoranges, range offsets and range bias.

Referring now also to FIG. 3, the remote receiver $22_i$ converts the time offsets to range offsets $RO_i$, which are in meters, by multiplying the time offsets $TO_i$ by the speed of light. A given range offset $RO_i$ includes both a range bias component Rb that is based on the unknown clock offset at the remote receiver and a distance component that is based on the difference in the positions of the base receiver 20 and remote receiver relative to the SOP transmitter $26_i$. The range bias component is the same for each signal of opportunity and is an unknown to be solved for by the remote receiver. The distance component is included in the unknown position coordinates of the remote receiver, that is, $X_{remote}$, $Y_{remote}$ and $Z_{remote}$, and is also solved for by the remote receiver.

The pseudorange to the remote receiver from an SOP transmitter $26_i$ is:

$$Psr_{remote-SOP_i} = \text{Range}_{base-SOP_i} + RO_i$$

As discussed, the range offset $RO_i$ includes both the range bias Rb and a distance component. Accordingly, the position and the clock offset of the remote receiver are calculated by substituting the calculated pseudorange and known $X_{SOPi}$, $Y_{SOP}$ and $Z_{SOPi}$ coordinates of the SOP transmitter $26_i$ into:

$$Psr_{remote-SOP_i} = \sqrt{(X_{remote} - X_{SOP_i})^2 + (Y_{remote} - Y_{SOP_i})^2} + Rb_{remote}$$

$i = 1 \ldots N$ for a two dimensional solution, or $$Psr_{remote-SOP_i} = \sqrt{(X_{remote} - X_{SOP_i})^2 + (Y_{remote} - Y_{SOP_i})^2 + (Z_{remote} - Z_{SOP_i})^2} + Rb_{remote}$$

for a three dimensional solution, where $N \geq 3$ for two dimensional solution and $N \geq 4$ for three dimensional solution. The clock offset from the base receiver is determined from the range bias as:

$$ClockOffset = Time_{base} - Time_{remote} = \frac{Rb}{C}$$

where C is the speed of light.

The solution is computed by forming a pseudorange equation for each of the selected SOP transmitters, and solving the set of equations simultaneously in a known manner to determine the unknowns $X_{remote}$, $Y_{remote}$, Rb and, in the three dimensional solution, $Z_{remote}$. There must be at least as many equations formed as there are unknowns to be solved. Accordingly, for a two dimensional solution at least 3 equations must be formed. For three dimensions, at least 4 equations are needed.

The position of the remote receiver $22_i$ can be determined as long as remote receiver is able to buffer enough samples to compensate for the maximum latency expected to transfer the time-tagged sampled data from the base. At start up, the system sets the times at the remote receivers based on the maximum data transfer latency of the network 24. If, for example, the internet is utilized as the communications network, the maximum data transfer latency is much less than one second and the remote receivers set their clocks to a time that is the time received in a message from the base receiver adjusted for the latency. The remote receiver saves 2 or 3 seconds of signal samples, such that the remote receiver can tolerate up to 3 seconds latency to align time-tagged samples received from the base receiver with saved time-tagged samples.

If a three dimensional position is required, the system could use signals of opportunity from at least four SOP transmitters $26_i$, assuming there are sufficient differentials in the elevations of the respective SOP transmitters and the base and remote receivers. Alternatively, the system could use a digital model of the area and an iterative process to determine the three dimensional positions from the known two- or three-dimensional position of the base receiver. If the model is used, the system first determines the elevation of the base receiver from an associated topological map, assuming the elevation is not determined from, for example, GNSS signals or otherwise known. The system also determines an average elevation from the map and sets the $Z_{remote}$ coordinates to the average value.

The base receiver determines its three dimensional ranges to the respective SOP transmitters, and provides the ranges to the remote receivers. The remote receivers determine their three dimensional positions as described above, but constraining their $Z_{remote}$ to the average elevation coordinates. Next, the remote receivers interpolate a more accurate $Z_{remote}$ from the digital elevation map by using their computed $X_{remote}$ and $Y_{remote}$ coordinates. The process is repeated until the solution converges. That is, the system then interpolates the results and assigns the remote receivers new elevations, determines the $X_{remote}$ and $Y_{remote}$ coordinates of the remote receivers while constraining the more accurate $Z_{remote}$ value, and so forth, until the position coordinates calculated and interpolated in an iteration do not change markedly from a previous iteration.

Once the positions and clock offsets of the remote receivers are determined, the system may synchronize the remote receiver clocks to the base receiver clocks and use the positions to provide accurate time transfer over the system.

The base receiver may be time synchronized with a reference time, such as GNSS time or UTC time, and thus, the clock error determined at the remote receiver is the clock error with respect to the reference time.

The base receivers may, instead of or in addition to providing range information, calculate the time of transmission of the series of samples, and provide the time of transmission to the remote receiver $22_i$ along with the samples. The remote receiver then determines its pseudorange based on the time offset from the calculated time of transmission, that is, the time difference between the received calculated time of transmission and the time of receipt of the series at the remote receiver. The pseudorange, in meters, is thus the time offset multiplied by the speed of light. The remote receiver then calculates its position based on the pseudoranges calculated for a plurality of the SOP transmitters in the manner described above.

For applications with even tighter frequency synchronization requirements, the base receiver 20 may instead or in addition provide the remote receiver $22_i$ with phase information associated with the broadcast signal of opportunity, such that the remote receiver can phase lock to the base reference frequency. To do this, the base receiver, operating in a known manner, uses its chosen reference frequency source, such as GPS satellite information, to determine a true clock frequency. The base receiver then phase locks to the broadcast signal of opportunity and continuously integrates the apparent frequency of the SOP carrier. Periodically, at for example every 1 second, the base receiver measures the value of the accumulating frequency integration, to provide an SOP phase measurement that includes integer and fractional carrier cycle components. The phase measurements are made at predetermined intervals, such as at second intervals with respect to the reference time and frequency.

The fractional cycle component can be measured accurately, however, the integer cycle component has an arbitrary start value, which must be assigned by the base receiver. The base receiver 20 has used its clock 21, which may be GNSS-tied frequency control, to determine the timing of the phase measurements, and thus, the phase measurements are based on the reference frequency to be distributed. The base receiver provides to the remote receivers $22_1 \ldots 22_n$ phase information, which includes the integer and fractional carrier cycle components, the time of the measurement, and information identifying the SOP transmitter, such as station identifier, nominal station frequency and so forth. In addition, the base receiver may send information relating to the quality of the signal and/or the base receiver tracking operation such as signal to noise ratio, number of seconds from acquisition, last lock break, or cycle slip and so forth.

Figure 4:
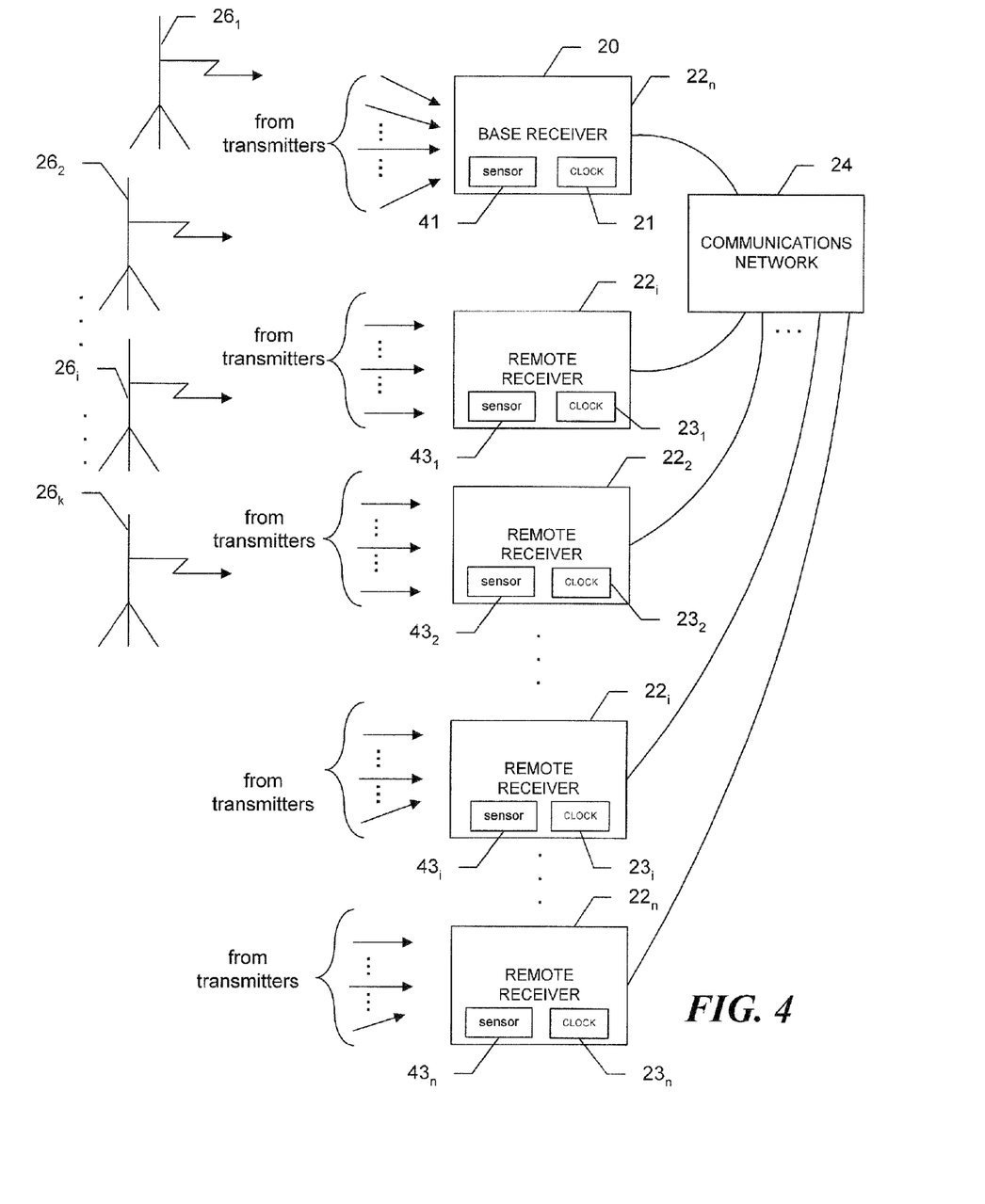
FIG. 4 is a functional block diagram of the system of FIG. 1 in which receivers further include pressure sensors.

A given remote receiver $22_i$ similarly phase locks to the broadcast signal of opportunity, and similarly continuously integrates its perceived SOP carrier frequency, and similarly periodically samples the phase of the SOP frequency integration process at a sample rate derived from the reference frequency of the remote receiver. The remote receiver compares its SOP phase measurements with that of the base receiver to establish the frequency difference between the base and remote receivers. Based on a first count received from the base receiver, the remote receiver sets its integer cycle count to the count set by the base receiver and adjusts the frequency of its clock such that the phase measurements at the remote are the same as at the base. The remote receiver determines frequency error as the rate of change between the phase measurements made at the base and at the remote receiver, based on subsequent phase measurement received from the base receiver. The remote receiver then synchronizes its clock frequency to the frequency of the base receiver clock, that is, to the reference frequency, using the calculated frequency errors. The remote receivers may also use the synchronized clocks to determine their positions, as appropriate. In an alternative arrangement as depicted in FIG. 4, the base receiver 20 and the remote receivers 22 include air pressure sensors 41 and 43. The base receiver has a known elevation and provides its air pressure sensor reading to the remote receivers. A given remote receiver then determines its elevation relative to the base receiver based on the differential between the air pressure sensor readings at the two receivers and standard air density gradient curves such as those used in aircraft barometric altimeters. The remote receiver can thus determine its actual elevation to within 1 or 2 meters, which is sufficient for determining, for example, on which floor of a building the remote receiver is located. The elevations of the remote receivers can thus be determined to the accuracy required for emergency personnel use or cell phone network congestion analysis using relatively low cost sensors.

The system described herein has the advantage of determining accurate positions of remote receivers utilizing broadcast signals of opportunity without having to solve carrier cycle ambiguities. The communication network may be wired or wireless. The known locations of the SOP transmitters may be trajectories rather than fixed locations. For example, an SOP transmitter may transmit from a moving platform such as an automobile, aircraft, ship or satellite, provided that the location and the velocity vector of the transmitter can be determined by the system. For a satellite transmitter, for example, the orbital ephemeris parameters must be readily available. The remote receivers may be mobile or fixed-position receivers.

What is claimed is:

1. A system for determining position utilizing signals of opportunity transmitted by at least three transmitters with known locations, the system comprising:
    a base receiver with a clock and a known position that calculates ranges to at least three of the transmitters and samples the signals of opportunity, time tags the signal samples with a time of receipt, a time of transmission or both and sends respective series of the time-tagged signal samples over a communications network;
    one or more remote receivers that receive information over the communications network, each remote receiver
        saving and time-tagging samples of signal segments of the signals of opportunity,
        correlating the time-tagged series of signal samples received over the communications network with the saved time-tagged samples of signal segments,
        determining for each of the at least three transmitters an associated time offset as a difference in the time of receipt at the remote receiver and either or both of the time of transmission by the transmitter or the time of receipt at the base receiver, and
        determining a position by determining pseudoranges to the at least three transmitters based on the time offsets.

2. The system of claim 1 wherein
    the base receiver sends the calculated ranges to the one or more remote receivers, and
    the remote receivers utilize the ranges in determining pseudoranges.

3. The system of claim 2 wherein a given remote receiver calculates a pseudorange to a given transmitter as the range of the base receiver to the transmitter minus a range offset that is the time offset multiplied by the speed of light.

4. The system of claim 2 wherein the given remote receiver further determines a clock offset from the pseudoranges calculated from the at least three transmitters.

5. The system of claim 1 wherein the remote receivers calculate pseudoranges based on time offsets of the times of receipt of the series of signal samples at the remote receivers from the times of transmission calculated at the base receivers.

6. The system of claim 1 wherein one or both of the base and remote receivers include configurable front end filters that scan the broadcast signals to select one or more of signals of opportunity for use.

7. The system of claim 1 wherein the communication network provides a list of usable signals of opportunity and one or both of the base and remote receivers selects one or more signals of opportunity from the list for use.

8. The system of claim 1 wherein the remote receivers adjust a phase of sample collection to more closely align the phase with a phase of sample collection at the base receiver.

9. The system of claim 8 wherein the remote receivers determine if early and late correlation measurements are symmetrical and if not shift the phase in the direction of the measurement that is larger.

10. The system of claim 1 wherein the base and remote receivers include pressure sensors and the remote receivers determine their elevations based on the differences between the pressure sensor readings at the base and the remote receivers.

11. The system of claim 1 wherein the remote receiver elevations are determined using an iterative process that in a first iteration constrains the elevations during position calculation to an average elevation.

12. The system of claim 8 wherein the remote receiver further resolves a carrier cycle integer ambiguity between the tracking channels of the remote receiver and the base receiver based on the alignment of the phases of the sample collection.

13. A method of determining position utilizing signals of opportunity transmitted by at least three transmitters with known locations, the method including the steps of
    calculating ranges from a known location to at least three of the transmitters;
    sampling the signals of opportunity at the known location and time tagging series of signal samples with times of receipt, times of transmission or both;
    sending respective series of the time-tagged signal samples over a communications network;
    at one or more unknown locations
    saving and time-tagging samples of the signal segments of the signals of opportunity,
    correlating the time-tagged series of signal samples received over the communications network with the saved time-tagged samples of signal segments,
    determining for each of the at least three transmitters an associated time offset as a difference in the time of receipt at the unknown location and either or both of the time of receipt at the known location or the time of transmission by the transmitter, and
    determining a position by determining pseudoranges to the at least three transmitters based on the time offsets.

14. The method of claim 13 wherein the calculated ranges are provided to the unknown locations and the ranges are utilized in determining pseudoranges.

15. The method of claim 14 wherein the step of determining pseudoranges further includes calculating the pseudorange to a given transmitter as the range of the known location to the transmitter minus a range offset that is the time offset multiplied by the speed of light.

16. The method of claim 13 wherein the pseudoranges are calculated based on time offsets that are the differences between the times of receipt of the series of signal samples at the unknown locations and the times of transmission calculated at the known locations.

17. The method of claim 13 further including determining a clock offset from the pseudoranges calculated from the at least three transmitters.

18. The method of claim 13 further including selecting one or more signals of opportunity for use in determining position.

19. The method of claim 18 further including scanning the broadcast signals to select best candidate signals of opportunity.

20. The method of claim 18 further including providing a list of usable signals of opportunity from which the one or more signals of opportunity are selected.

21. The method of claim 13 wherein the step of correlating further includes adjusting a phase of sample collection to more closely align the phase with a phase of sample collection at the known location.

22. The method of claim 21 wherein the step of adjusting further includes determining if early and late correlation measurements are symmetrical and if not shifting the phase in the direction of the measurement that is larger.

23. The method of claim 13 wherein the step of determining position further includes determining elevation based on differences between pressure sensor readings at the known and unknown locations.

24. The method of claim 13 wherein the step of determining position further includes determining elevation using an iterative process that in a first iteration constrains the elevations during position calculation to an average elevation.

25. The method of claim 21 wherein the step of correlating further includes resolving a carrier cycle integer ambiguity between tracking channels of receivers at the known and unknown locations based on the alignment of the phases of the sample collection.

* * * * *